Figure 1:
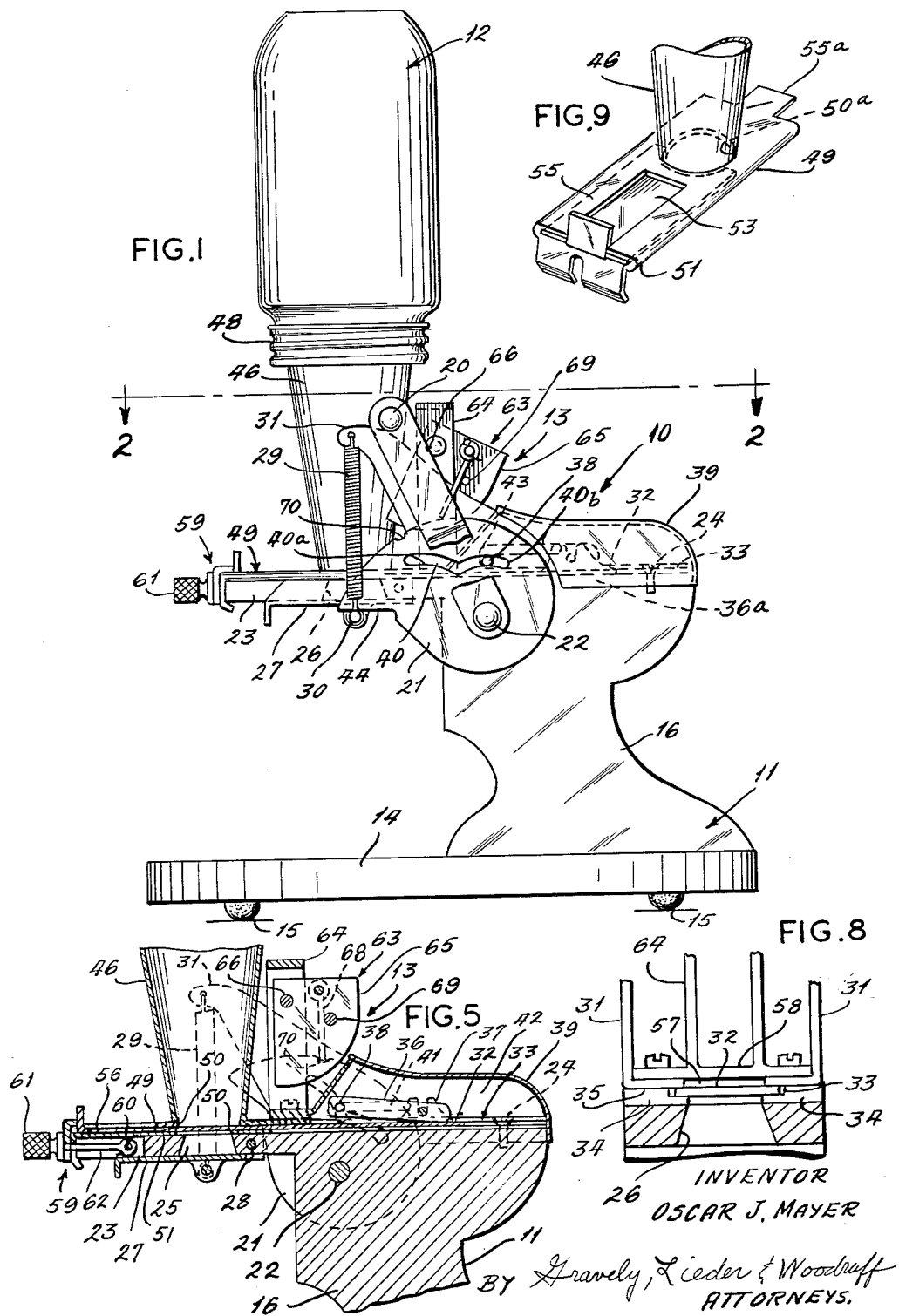

June 4, 1963  O. J. MAYER  3,092,292
INSTANT COFFEE AND TEA DISPENSING MACHINE
Filed Oct. 3, 1960  2 Sheets-Sheet 1

INVENTOR
OSCAR J. MAYER
BY Gravely, Lieder & Woodruff
ATTORNEYS.

June 4, 1963 — O. J. MAYER — 3,092,292
INSTANT COFFEE AND TEA DISPENSING MACHINE
Filed Oct. 3, 1960 — 2 Sheets-Sheet 2
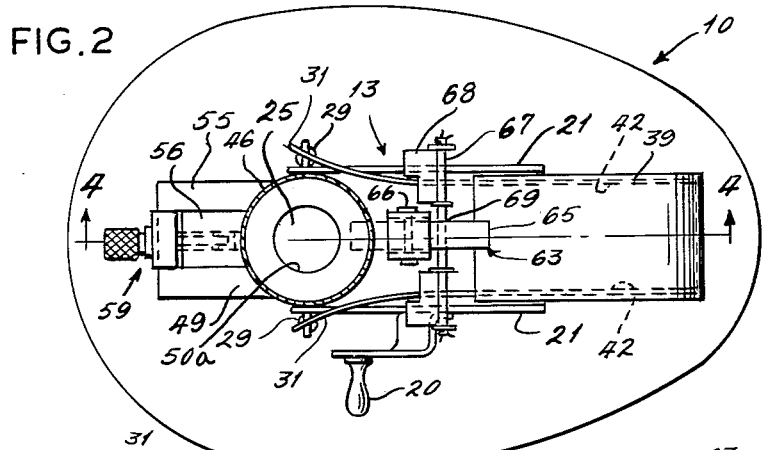
FIG. 2
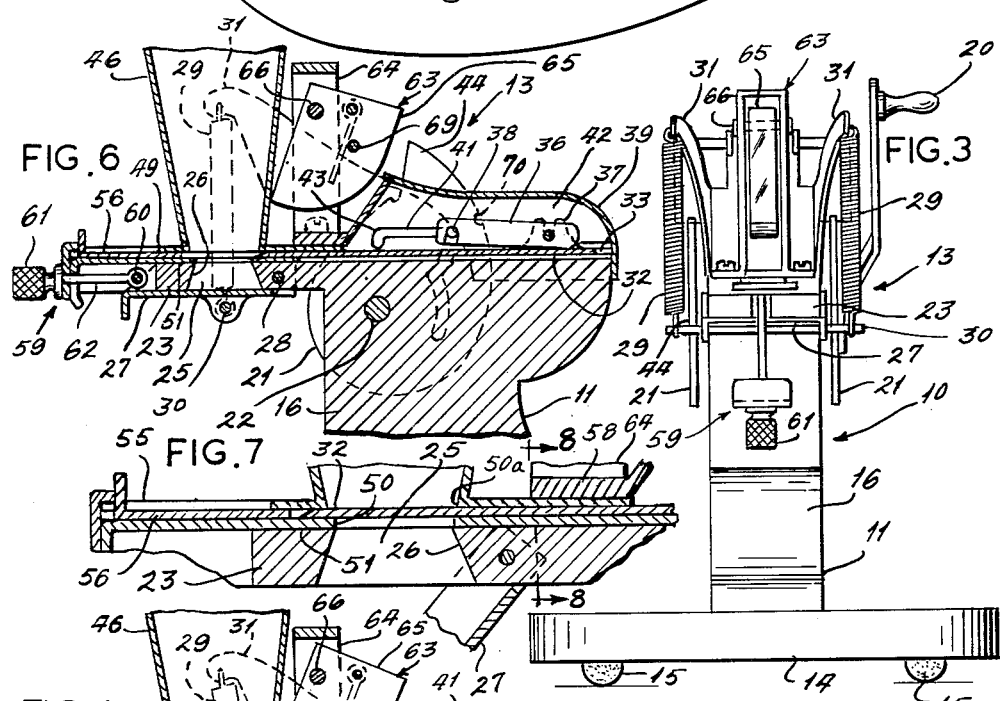
FIG. 6
FIG. 7
FIG. 4
FIG. 3
INVENTOR
OSCAR J. MAYER
By Gravely, Lieder & Woodruff
ATTORNEYS.

United States Patent Office 3,092,292
Patented June 4, 1963

3,092,292
INSTANT COFFEE AND TEA DISPENSING
MACHINE
Oscar Joseph Mayer, St. Louis, Mo., assignor of one-half
to Dorothy Jane Mahaffey Carpenter, Clayton, Mo.
Filed Oct. 3, 1960, Ser. No. 59,871
5 Claims. (Cl. 222—185)

The present invention relates to dispensers for dispensing selected amounts of granular material. The present invention particularly relates to a device for dispensing predetermined portions of instantized material such as instant coffee or instant tea.

None of the numerous dispensing devices presently available perform satisfactorily as a dispenser for instantized products, particularly coffee, since the coffee particles tend to clog the working parts, particularly when the particles are dragged between a large area of closely contacting metal surfaces. It is an object of the present invention to provide a device which will satisfactorily dispense a preselected amount of granular material, particularly instant coffee.

It is a further object to provide an apparatus for dispensing instantized materials which can be easily disassembled for cleaning and afterward easily reassembled, and which does not tend to clog or malfunction even after extensive use.

It is a further object of the present invention to provide a device for dispensing instant coffee having means to receive a container of instant coffee to seal the instantized material from contact with the air after the container has been opened, thereby preventing the material from becoming hard or forming lumps due to the moisture normally in the atmosphere.

Further objects and advantages will become apparent hereinafter.

The present invention comprises a device for dispensing granular materials, particularly instant coffee, said device including means for storing the instantized material, a non-clogging slide operated mechanism for measuring a preselected amount of coffee, and means for delivering the coffee to a suitable receptacle. The present invention further comprises the method and apparatus hereinafter described and claimed.

The invention also consists in the parts and in the arrangements and combinations of parts hereinafter described and claimed. In the accompanying drawings which form part of this specification and wherein like numerals refer to like parts wherever they occur, FIG. 1 is a side view of the present invention, FIG. 2 is a sectional view taken along line 2—2 of FIG. 1, FIG. 3 is an end view of the invention shown in FIG. 1 with the receptacle and funnel assembly removed, FIG. 4 is a partial sectional view taken along the line 4—4 of FIG. 2 with the cam plate rotated in its furthermost counterclockwise position, FIG. 5 is a view similar to FIG. 4 with the cam plate rotated to an intermediate clockwise position, FIG. 6 is a view similar to FIG. 4 with the cam plate rotated to its furthermost clockwise position, FIG. 7 is a greatly enlarged fragmentary sectional view of the top closure mechanism for the platform opening, FIG. 8 is a greatly enlarged fragmentary sectional view through the platform showing the slide and runway assembly, and FIG. 9 is a perspective view of the funnel and base assembly.

The dispensing apparatus 10 includes a stand 11, a container 12 for storing granular material such as instant coffee, and a dispensing mechanism 13 for measuring and delivering a preselected amount of instant coffee to a suitable receptacle (not shown).

The stand 11 includes a base 14 supported on legs 15 and having an upright portion 16 fixed thereto. The upright 16 acts as a seat for the dispensing mechanism 13 which includes a handle 20 fastened to a cam plate 21 with both the cam plate 21 and handle 20 being pivotally mounted at 22 on the upright 16. A platform member 23 is fastened to the upright 16 by screws 24 and is provided with an opening 25 (FIG. 2) adjacent to one end thereof. The opening 25 is adapted to measure and retain a preselected serving of instant coffee, and has diverging side walls 26 so that the granular material can fall freely from the opening 25.

A trough or chute 27, which is pivoted at 28 (FIG. 6) to the platform member 23 forms a second or bottom closure member for the opening 25. Resilient means 29 fastened to pins 30 on the chute 27 and to elongated arms 31 on the upright 16 normally urge the trough 27 into closed position adjacent to the undersurface of the platform 23.

A top closure assembly for the opening 25 comprises a movable first closure member or elongated slide 32 constructed and arranged to alternately cover and uncover the top of the opening 25 in the platform member 23. The slide 32 moves in runways 33 (FIG. 8) on each side of the platform 23. The runways 33 are defined between a spacer 34 and an inturned flange 35 on the arms 31. The spacer 34 spaces the slide 32 from the top of the platform member 23 to keep the slide from dragging particles of an instantized product across the top of the platform 23. When instant coffee is subjected to the heat generated by the friction of two metal surfaces being dragged across one another, it causes the moving parts to stick and it finally hardens and makes the parts immovable.

The actuating mechanism for the slide 32 includes a connecting member 36 removably fastened by a pin 36a to a slotted sled 37 which in turn is fastened to the slide 32. A cam follower 38 carried by the connecting member 36 is movable in cam slots 40 and 41 formed in the cam plate 21 and in the side of the housing 42, respectively. The cam slot 41 in the housing 42 is generally longitudinal with a stop portion 43 (FIG. 6) at the end nearer the platform opening 25 into which the cam follower 38 drops when the handle 20 and cam plate 21 are rotated in a counterclockwise direction.

The cam slot 40 in the cam plate 21 generally has a double wing shape with a first actuating portion 40a adjacent to a nose 44 on the cam plate 21 and a second inert or pin passing portion 40b.

The cam plate nose 44 engages the pins 30 projecting from the spring loaded chute 27 as the handle 20 is rotated in a counterclockwise direction (FIG. 1). The chute 27 is biased against the under side of the platform member 23 by the springs 29 to cover the opening 25 therein.

In operation, as the handle 20 is rotated in a counterclockwise direction, the cam follower 38 is moved by the cam slot actuating portion 40a in the cam plate 21 in a lateral direction toward the opening 25. The follower 38 also moves in the cam slot 41 until it falls into the stop portion 43. The connecting member 36, which moves wth the cam follower 38, pulls the slide 32 toward the opening 25 in the platform 23. When the handle 20 and cam plate 21 reach the position shown in FIG. 1, the cam follower 38 falls into the slot 43 and the slide 32 forms a top closure member for the opening 25 interrupting flow of granular material from the container 12. As the handle 20 and the cam plate 21 are rotated further in a counterclockwise direction (FIG. 4), the cam plate nose 44 engages the pin 30 and rotates the chute 27 about the pivot 28 in a downward direction against the action of the spring 29 to allow the entrapped material retained in the opening to fall down along the chute 27 to a suitably placed receptacle.

The slide 32 and sled 37 can be removed from the assembly 13 for cleaning by lifting the connecting member 36 and the pin 36a from the sled 37 and moving the slide 32 along the runways 33 rearwardly away from the platform opening 25.

A removable cover 39 fits over the back and top of the mechanism 13 to give a finished appearance to the device 10.

A funnel assembly 46 is adapted to engage both the receptacle 12 and the platform member 23. The receptacle 12 is fastened to the funnel 46 by an open top threaded cap 48. The funnel 46 is fastened to a base assembly 49 having an opening 50 therethrough. The opening 50 coincides with the platform opening 25 to provide communication between the container 12 and the opening 25 for the material held in the container 12.

The base assembly 49 (FIG. 7) for the funnel 46 includes a bottom plate 51 and a top plate 55. A manually movable closure member 56 is received in a runway defined between the bottom plate 51 and the top plate 55 and is adapted to be moved toward the funnel 46 to interrupt the flow of material from the container 12 to the platform opening 25, when it is necessary to remove the funnel assembly 46 for cleaning. The slide 32 is received in the same runway as the member 56 when in extended position. Therefore, when the handle 20 is rotated to move the slide 32 toward the opening 25, the slide 32 engages the closure member 56 to move said member 56 toward an open position away from the opening 25.

A top plate extension 55a is received in a pocket 57 defined between the top of the slide member 32 and a cover plate 58. A lock assembly 59 is pivoted at 60 to the platform 23 and engages the end of the base assembly 49 so that when the lock nut 61 is screwed on to the threaded rod 62, each end of the base assembly 49 is fixed to the platform 23.

A tapping assembly 63 is optionally provided on the base 13 to give the funnel 46 a sharp rap to dislodge any material which may become fixed to the funnel sides. The tapper assembly 63 includes a U-shaped frame 64 fixed to the plate 58, a tapper 65 pivoted at 66 to the frame 64, arms 67 loosely carrying a flange 68, and a stop bar 69 for the flange 68.

The outer periphery of the cam plates 21 are provided with notches 70 which engage the flange 68 to start the tapping assembly 63 into operation as hreinafter explained.

After the handle 20 has been moved as far as it will go in a counterclockwise direction and the measured amount of instantized material in the opening 17 has been deposited in a receptacle placed beneath the chute (FIG. 4), the handle is rotated in a clockwise direction through the position of FIG. 5 where the catch flange 68 engages the cam plate notches 70 to start the tapping operation.

As the handle 20 is rotated further in a clockwise direction, the flange 68 engages the stop bar 69 and rides on the outer periphery of the cam plate 21 rotating the tapper 65 about the pivot 66 in a counterclockwise direction into a loaded position. As the flange 68 rides over the nose 44 of the cam plate 21, the tapper 65 moves rapidly in a clockwise direction and sharply engages the side of the funnel 46 is dislodge any material stuck on the inner surface thereof (FIG. 6). Simultaneously with the moving of the tapper 65 into loaded position, the cam follower 38 is moved into the actuating portion 41a of the cam slot 41 and the slide 32 is moved away from the opening 25 and communication is reestablished between the container 46 and the opening 25.

To briefly review a complete operating cycle, a container of instant coffee 12 is assembled to the funnel 46 and the assembly is inverted and attached to the platform 23, being certain that the closure member 56 is moved to a position interrupting flow of material from the end of the funnel 46.

After the container 12 and funnel 46 are attached to the platform 23, the closure member 56 is opened, and since the slide 32 is in open position, the opening 25 is filled with material from the container 12. To deliver the measured quantity of granular material trapped in the opening 25 into a receptacle, the handle 20 and cam plate 21 are moved in a counterclockwise direction and the slide 32 moves therewith to cover the opening 25 and interrupt the flow of material from the funnel 46. As the handle 20 and cam plate 21 are continued to be rotated in a counterclockwise direction, the cam plate nose 44 engages the pin 30 and opens the chute 27 delivering the measured amount of coffee to a suitably placed receptacle as hereinbefore described.

Thus it is seen that as the slide 32 moves in the runways 33, it is spaced from the top surface of the platform 23 and thereby the metal to metal contact is limited to the small engagement of the slide 32 with the runways 33 and with the under surface of the top plate extension 55a. Therefore, the slide 32 does not drag instant coffee with it as it moves between closely contacting surfaces, which would soon cause the sliding mechanism to stick and cease functioning. The width of the slide 32 is limited to that necessary to cover the opening 25, thereby further limiting opportunities for malfunctioning of the apparatus. Also, the forward end of the slide has a knife or tapered edge to enable the slide 32 to cut through the granular instantized material. An edge 50a of the top plate opening 50 acts to wipe the top of the slide 32 as it passes beneath said edge and thereby remove any granules of material resting on the top surface of the slide 32 before they can be dragged back into the assembly 13 as the slide 32 is moved into its retracted position. Since both the slide 32 and the funnel and base assembly 46 can be easily removed for cleaning, it is apparent that a satisfactory dispensing apparatus for instantized granular material has been provided.

Thus it is seen that the present invention provides a device which achieves all of the objects and advantages sought therefor.

The present invention is intended to cover all changes and modifications of the examples of the invention herein chosen for purposes of the disclosure which do not constitute departures from the spirit and scope of the invention.

What is claimed is:

1. A dispensing apparatus comprising a base stand, a platform having an opening therethrough, a container for holding material to be dispensed, said container being in communication with said opening in said platform, a first closure member movable between retracted position and extended position, said first closure member being adapted to totally interrupt communication between said platform opening and said receptacle when in extended position, means actuating said first closure member, a second closure assembly removably fastened to said platform, said second closure assembly including a manually movable slide horizontally aligned with said first closure member and adapted to totally interrupt communication between said container and said platform opening only when said first member is in retracted position, and a third closure member normally positioned against the underside of said platform beneath said opening to form a bottom closure therefor and movable to an open position when said first closure member has interrupted communication between said container and said opening.

2. A dispensing apparatus for dispensing a selected amount of instantized material comprising a base stand, a platform mounted on said base stand and having an opening therethrough, said opening holding a preselected amount of instantized material, a receptacle for instantized material positioned above said platform opening, said receptacle being in communication with said platform opening, a slide closure member movable between extended and retracted positions and adapted to cover said opening and interrupt communication between said opening and said receptacle when in extended position and to expose said opening and establish communication between said opening and said receptacle when in retracted position, a slide actuating mechanism including a cam plate having a slot therein, a pin connected to said slide movable in said slot, said slot having a camming portion and an inactive portion whereby rotation of said cam plate in a first direction moves said pin in said camming portion of said slot and moves said slide toward said extended position, a pivotally mounted chute, spring means urging said chute against the bottom surface of said platform to form a bottom closure for said platform opening, a nose on said cam plate, further rotation of said cam plate in said first direction causing said cam plate nose to engage said chute and rotate said chute to an open position whereby said chute dispenses the instantized material trapped in the platform opening to a suitably placed receptacle, said pin riding through the inactive portion of said slot during movement of said chute, and a tapper assembly adapted to rap the container, said assembly including a pivotally mounted tapper and a flange fixed to the tapper and movable on the outer periphery of the cam plate when said cam plate is rotated in a second direction to move said slide toward retracted position, said tapper sharply engaging said container when said flange rides off the end of said cam plate to dislodge any instantized material stuck to said container.

3. A dispensing apparatus comprising a base stand, a platform mounted on said base stand having an opening therethrough, a receptacle communicating with said platform opening, a slide closure member longitudinally movable along said platform to interrupt and establish communication between said platform opening and said receptacle, runways positioned on said platform, said slide being housed in said runways and spaced from the top surface of said platform, a slide actuating mechanism including a cam plate having a slot therein, a pin connected to said slide movable in said slot, said slot having a camming position and an inactive portion whereby rotation of said cam plate in a first direction moves said pin in said camming portion of said slot and moves said slide closure member to interrupt communication between said receptacle and said platform opening, a pivoted bottom closure member resiliently urged toward said platform to form a bottom closure member for said opening, means on said cam plate for engaging said bottom closure member upon further rotation of said cam plate to pivot said bottom closure member itno an open position, and a manual closure assembly comprising means of releasably attaching said assembly to said platform and a manually actuated longitudinally movable closure member normally spaced from said platform opening, said closure member being movable toward said platform opening to interrupt communication between said receptacle and said platform opening.

4. A dispensing apparatus comprising a base stand, a platform mounted on said base stand having an opening therethrough, a receptacle positioned above and in communication with said platform opening, a removable first closure member longitudinally movable along said platform to alternately establish and interrupt communication between said platform opening and said receptacle, said first closure member being spaced from the top surface of said platform, an actuating mechanism for said first closure member including a pivoted cam plate having a slot therein, means releasably connecting said slide to said cam plate slot, said slot having a camming portion and a pin passing portion whereby rotation of said cam plate about said pivot moves said connecting means in said camming portion of said slot to move said first closure member toward said platform opening, a second closure member pivotally attached to said platform, resilient means urging said chute toward the bottom of said platform to form a bottom closure for said platform opening, means on said cam plate for engaging said second closure member whereby further rotation of said cam plate rotates said second closure member into an open position away from the bottom of said platform, said connecting means riding through the pin passing portion of said slot during rotation of said second closure member, a tapper assembly adapted to rap said receptacle after said first closure member has been moved away from said platform opening to establish communication between said receptacle and said platform opening, said tapper assembly comprising a piovtally mounted tapper, a flange fixed to the tapper and movable on the outer periphery of the cam plate during movement of said first closure member away from said platform opening, said tapper sharply engaging said receptacle when said flange rides off the end of said cam plate, and a manually actuated closure assembly including means releasably fastening said assembly to said platform and a third closure member longitudinally movable along said platform independently of said first and second closure members, said third closure member being constructed and arranged to independently interrupt communication between said receptacle and said platform.

5. A dispenser for instantized products comprising a base stand, a platform positioned on said base stand and having an opening therethrough, a receptacle for instantized products having a substantially moisture proof closure thereon, said receptacle being in communication with said platform opening, a runway positioned on said platform, a removable first closure member having a tapered leading edge and being laterally movable along said platform in said runway, said first closure member being spaced from the top surface of said platform by said runway, said first closure member being adapted to interrupt communication between said platform opening and said receptacle, a wiping element positioned immediately above said first closure member to sweep loose particles of instantized material from said closure member as it is moved along said runway in establishing communication between said receptacle and said platform opening, means for actuating said first closure member including a rotatable plate having a cam slot therein, means linking said slot to said first closure member, said linking means moving in said cam slot to move said first closure member over said platform opening as said plate is rotated, said linking means being releasably connected between said first closure member and said actuating means whereby said first closure member is removable from said runway without disturbing said actuating means, a second closure member pivoted to said platform and normally urged against the underside of said platform to form a bottom closure for said platform opening, and cooperating means on said second closure member and said plate whereby said plate engages and piovtally opens said second closure member as said plate is rotated further after said first closure member has interrupted communication between said receptacle and said platform opening.

References Cited in the file of this patent

UNITED STATES PATENTS

| | | |
|---|---|---|
| 1,857,734 | Moldovan et al. | May 10, 1932 |
| 2,004,500 | Brunelle | June 11, 1935 |
| 2,341,031 | Flynn | Feb. 8, 1944 |
| 2,727,656 | Packwood | Dec. 20, 1955 |
| 2,749,940 | Bronson | June 12, 1956 |
| 2,775,270 | McKillop | Dec. 25, 1956 |

FOREIGN PATENTS

| | | |
|---|---|---|
| 322,089 | Italy | Oct. 27, 1934 |